United States Patent
Taniguchi et al.

(10) Patent No.: US 11,806,690 B2
(45) Date of Patent: Nov. 7, 2023

(54) ACID-TREATED FILTER AID BLEND

(71) Applicant: Imerys USA, Inc., Roswell, GA (US)

(72) Inventors: Jeffrey D. Taniguchi, Santa Maria, CA (US); Larisa Tihomirov, Lompoc, CA (US)

(73) Assignee: Imerys USA, Inc., Roswell, GA (US)

( * ) Notice: Subject to any disclaimer, the term of this patent is extended or adjusted under 35 U.S.C. 154(b) by 322 days.

(21) Appl. No.: 16/950,943

(22) Filed: Nov. 18, 2020

(65) Prior Publication Data

US 2021/0069670 A1    Mar. 11, 2021

Related U.S. Application Data

(62) Division of application No. 16/073,417, filed as application No. PCT/US2017/015425 on Jan. 27, 2017, now Pat. No. 10,864,497.

(60) Provisional application No. 62/288,218, filed on Jan. 28, 2016.

(51) Int. Cl.
| | |
|---|---|
| *B01J 20/10* | (2006.01) |
| *B01D 37/02* | (2006.01) |
| *B01J 20/28* | (2006.01) |
| *B01J 20/30* | (2006.01) |
| *B01J 20/14* | (2006.01) |
| *A23F 3/20* | (2006.01) |
| *A23L 2/72* | (2006.01) |
| *C12H 1/07* | (2006.01) |

(52) U.S. Cl.
CPC ............ *B01J 20/103* (2013.01); *A23F 3/20* (2013.01); *A23L 2/72* (2013.01); *B01D 37/02* (2013.01); *B01J 20/10* (2013.01); *B01J 20/106* (2013.01); *B01J 20/14* (2013.01); *B01J 20/28011* (2013.01); *B01J 20/28092* (2013.01); *B01J 20/30* (2013.01); *B01J 20/3085* (2013.01); *C12H 1/063* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 4,142,968 A | 3/1979 | Nielsen et al. | |
| 4,965,084 A | 10/1990 | Austin et al. | |
| 5,500,038 A | 3/1996 | Dauber et al. | |
| 5,656,568 A | 8/1997 | Shiuh et al. | |
| 5,908,561 A | 6/1999 | Palm et al. | |
| 6,712,974 B1 * | 3/2004 | Palm ................. | B01J 20/10 |
| | | | 502/410 |
| 7,972,644 B2 | 7/2011 | Sugimoto et al. | |
| 2001/0023233 A1 | 9/2001 | Shiuh et al. | |
| 2003/0054077 A1 | 3/2003 | Ishiwata et al. | |
| 2011/0076361 A1 | 3/2011 | Peterson et al. | |
| 2012/0172195 A1 | 7/2012 | Hu et al. | |
| 2013/0196025 A1 | 8/2013 | Noordman | |
| 2013/0228521 A1 | 9/2013 | Guo et al. | |
| 2015/0129490 A1 | 5/2015 | Wang et al. | |

FOREIGN PATENT DOCUMENTS

| | | |
|---|---|---|
| JP | H08173718 A | 7/1996 |
| JP | H0952709 A | 2/1997 |
| JP | 09173044 A | 7/1997 |
| WO | WO 2014/004349 A1 | 1/2014 |

OTHER PUBLICATIONS

European Search Report for EP 17 74 5005, dated Sep. 2, 2019.
International Search Report and Written Opinion dated Apr. 14, 2017, in International Application No. PCT/US2017/015425 (12 pages).

* cited by examiner

*Primary Examiner* — Colin W. Slifka
*Assistant Examiner* — Michael Forrest
(74) *Attorney, Agent, or Firm* — Finnegan, Henderson, Farabow, Garrett & Dunner, LLP (57) ABSTRACT

A filter aid composition may include a first acid-treated silica-based filter aid having a first particle size distribution and a second acid-treated silica-based filter aid having a second particle size distribution. A method of making a filter aid composition may include providing a first silica-based filter aid having a first particle size distribution, providing a second silica-based filter aid having a second particle size distribution, and blending the first silica-based filter aid with the second silica-based filter aid to form the filter aid composition. A method of filtering a fluid may include providing a filter aid composition including a first acid-treated silica-based filter aid and a second acid-treated silica-based filter aid and filtering the fluid through the filter aid composition. The filter aid composition may have a multimodal particle size distribution such that the first particle size distribution has a d50 greater than the second particle size distribution.

19 Claims, 2 Drawing Sheets

ACID-TREATED FILTER AID BLEND

CROSS-REFERENCE TO RELATED APPLICATIONS

This application is a divisional application of pending U.S. application Ser. No. 16/073,417, filed on Jul. 27, 2018, which is a national stage entry of PCT/US2017/015425, filed on Jan. 27, 2017, which claims the benefit of priority from U.S. Provisional Application No. 62/288,218, filed on Jan. 28, 2016, now expired, the content of each of which is incorporated by reference herein in its entirety.

FIELD OF THE DISCLOSURE

The present disclosure relates to acid-treated filter aids. The disclosure further relates to methods of making acid-treated filter aids and methods of using acid-treated filter aids. The disclosure also relates to filter aid products having a low content of soluble metals and high filtration rates.

BACKGROUND

Many beverages, such as green tea, may have floating, cloudy, flocky (flocculent), precipitate-like sediment, particles, and the like (collectively referred to as "sediment") in the packaging as a result of the process for making the beverage. For beverages filled in transparent containers, such as teas, sediment can lead to an undesirable appearance and can lead to the loss of its market value or reduced sales based on consumers' desire to avoid beverages with sediment.

Sediment can be described in various forms, including "primary sediment," which can start precipitating soon after the beverage is manufactured, and "secondary sediment," which can precipitate gradually after manufacturing, including during storage and transport to sellers or consumers. Primary sediment formation has attempted to be mitigated by methods including centrifugation, enzymatic treatment, and membrane filtration with varying success. Secondary sediment is more difficult to prevent, although some methods have been proposed and attempted. Filtration is one proposed method, but filter aids having sufficient filtration properties are both expensive and in high demand. Therefore, they can be difficult to obtain and increase the cost of producing a desirable beverage.

Accordingly, it may be desirable to provide an improved filter aid for filtering beverages. It may also be desirable to provide a filter aid that reduces sediment and impurities having a lower production cost with acceptable filtration rates. It may also be desirable to provide an improved method of filtering a liquid.

SUMMARY

According to one aspect of this disclosure, a filter aid composition may include a first acid-treated silica-based filter aid having a first particle size distribution and a second acid-treated silica-based filter aid having a second particle size distribution. The filter aid composition may have a multimodal particle size distribution such that the first particle size distribution has a $d_{50}$ greater than the second particle size distribution.

According to another aspect, a method of making a filter aid composition may include providing a first silica-based filter aid having a first particle size distribution, providing a second silica-based filter aid having a second particle size distribution, and blending the first silica-based filter aid with the second silica-based filter aid to form the filter aid composition. The filter aid composition may have a multimodal particle size distribution such that the first particle size distribution has a $d_{50}$ greater than the second particle size distribution. In another aspect, the first silica-based filter aid and the second silica-based filter aid may be acid-treated.

According to another aspect, a method of filtering a fluid may include providing a filter aid composition including a first acid-treated silica-based filter aid and a second acid-treated silica-based filter aid, and filtering the fluid through the filter aid composition. The filter aid composition may have a particle size distribution such that a particle size distribution of the first silica-based filter aid has a $d_{50}$ greater than a particle size distribution of the second silica-based filter aid.

According to still another aspect, a method of preparing a filter aid may include providing a first silica-based filter aid composition, providing a first acid composition selected from the group of oxalic acid and glacial acetic acid, and extracting soluble metals from the first silica-based filter aid composition using the first acid composition.

DESCRIPTION OF THE DRAWINGS

Exemplary embodiments will be further illustrated by reference to the following figures.

DETAILED DESCRIPTION

According to some embodiments, the present disclosure may provide acid-treated silica-based filter aids for filtering beverages.

The terms "about" and "approximately" refer to being nearly the same as a referenced amount or value, and should be understood to encompass ±5% of the specified amount or value.

The particle size properties for the minerals were measured according to the methods known to the skilled person in the art using light scattering of the particulate materials in a fully dispersed condition in an aqueous medium using a Microtrac S3500 laser diffraction machine supplied by Microtrac, a member of Nikkiso. The size of the particles is referred to as the "equivalent spherical diameter" (esd). The measured particle size can be provided as a plot of the cumulative percentage by weight of particles having a given size less than the esd values. The median particle size, $d_{50}$, is the value determined to be the esd at which 50% of the particles by weight have an esd less than that of the particular value.

Many silica-based materials, such as diatomite, can be used to filter liquids, for example, beer or tea, such as green tea. This can, in some cases, result in contamination of the liquid with metals, such as iron (as $Fe^{2+}$ and/or $Fe^{3+}$ ions) or aluminum (as $Al^{3+}$ ions). It is therefore desirable to reduce the soluble metal content, including reducing the soluble iron and/or aluminum content, in the diatomite product. The amount of soluble metal ions soluble in beer (e.g., beer-soluble iron, beer-soluble aluminum) may provide useful indicators of the degree to which contamination by these impurities occurs, which may indicate the solubility in other liquids, such as tea.

Analytical methods have been established in the industry to determine the solubility of iron from diatomite products. According to the method used herein, a filter aid is leached with a citric acid/ethanol solution. Ferric iron present in the solution is then reduced by adding ascorbic acid. The resulting ferrous iron forms a purple colored complex with the FerroZine® reagent, a compound of disodium salt of 3-(2-pyridyl)-5,6-bis (4-phenylsulfonic acid)-1,2,4-triazine, such that the iron concentration is determined by a spectrophotometer. As used herein, "soluble iron content" refers to the amount of soluble iron measured via the citric acid/ethanol solution extraction procedure (see Example 3).

Another method for testing the solubility of iron from diatomite products uses inductively-coupled argon plasma emission spectrophotometry (ICP). This method uses HCl to extract iron from a filter aid, and then analyzes the acid extraction by ICP.

Yet another method developed by the American Society of Brewing Chemists (ASBC, 1987) determines the beer soluble content of iron as an indicator of iron solubility for various liquids. The ASBC method is a calibrated colorimetric method employing 1,10-phenanthroline (i.e., o-phenanthroline, $C_{12}H_8N_2$). If the sample to be tested is a non-calcined product, the sample should be dried to constant weight at 110° C. in air, and subsequently allowed to cool to room temperature in air (i.e., dried). If the sample to be tested is a calcined or flux calcined product, the sample should be dried to constant weight at room temperature in air. A 5 g sample is added to 200 mL of decarbonated beer (such as BUDWEISER®, registered trademark of Anheuser-Busch) at room temperature, and the mixture swirled intermittently for an elapsed time of 5 min and 50 sec. The mixture is then immediately transferred to a funnel containing 25 cm diameter filter paper, from which the filtrate collected during the first 30 sec is discarded. Filtrate is then collected for the next 150 sec, and a 25 mL portion is treated with approximately 25 mg of ascorbic acid ($C_6H_8O_6$) to reduce dissolved iron ions to the ferrous (i.e., $Fe^{2+}$) state to yield a "sample extract." The color is developed by addition of 1 mL of 0.3% (w/v) 1,10-phenanthroline, and, after 30 min, the absorbance of the resulting sample solution is compared to a standard calibration curve. The calibration curve is prepared from standard iron solutions of known concentration in beer. Untreated filtrate is used as a method blank to correct for turbidity and color. Absorbance is measured at 505 nm using a spectrophotometer, in this case, a Milton & Bradley Spectronic. The quantitation limit (i.e., detection limit) may be approximately 2 mg Fe/kg filter aid.

Analytical methods also have been established to determine the solubility of aluminum from diatomite products. According to the method used herein, a filter aid is leached with a citric acid/ethanol solution, and the aluminum in the filtrate is then atomized in a graphite furnace. The ground state atoms of aluminum absorb radiation at 309.4 nm emitted by a hollow cathode lamp. The concentration of aluminum is then determined by reference to a calibration curve obtained by the application of Beer's Law. As used herein, "soluble aluminum content" refers to the amount of soluble aluminum measured via the citric acid/ethanol solution extraction procedure (see Example 4).

Another method for determining the solubility of aluminum from diatomite products uses inductively-coupled argon plasma emission spectrophotometry (ICP). Sample extracts are prepared according to the American Society of Brewing Chemists (ASBC) method for beer (as described above for iron), and diluted with 2% (v/v) nitric acid in deionized water to a concentration of 20% (v/v) beer. This dilution is necessary to optimize sensitivity while maintaining plasma stability. Analysis data from the diluted extract solutions can be collected using a Baird Model PSX sequential ICP spectrophotometer capable of operating in multiple spectroscopic orders from 160 nm to 800 nm. The unit is equipped with a thermostatted 0.75 m modified Czemy-Turner monochromator (Acton Research Corporation Model L-507) evacuated to 8.5 Pa (about 65 millitorr) and employs a crystal-controlled oscillator which generates a radio frequency of 40.68 MHz, and produces a plasma at a concentric fused silica torch assembly by applying 700 W forward power (for the analyses presented here) with less than 0.5 W of power being reflected. Welding-grade liquid argon was used for the primary plasma, and was delivered through a mass flow controller (Emerson Electric Company, Brooks Instrument Division MODEL 5876) at approximately 46 relative units. An argon purge was supplied to the interface optics at 4.0 relative units as measured with a Matheson rotameter. Wavelengths were selected using a sine bar mechanism, with absolute reference wavelengths established at the grating edge of 160.000 nm and at the primary standard argon emission wavelength of 15.859 nm. Soluble aluminum may be determined at the first order 396.152 nm spectral line. Spectral interferences from calcium, vanadium, and manganese can also be evaluated for this line and a determination of interference can be made to account for these additional metals. Intensities for sample solutions can be compared with those for a series of standards prepared in beer from commercial aluminum standard reference solutions (Spex Industries, Inc.). The quantitation limit (i.e., detection limit) may be approximately 2 mg Al/kg filter aid.

The total silica content of the silica-based filter aids (both before or after acid treatment) can be determined by using x-ray fluorescence spectrometry. This technique is also useful to determine the total content of other elements, such as aluminum, iron, and sodium.

The "fused tetraborate matrix" x-ray fluorescence method can be used to determine the total element contents of the silica-based filter aids. In this method, a 2 gram diatomite sample (after roasting at 950° C. in air for 1 hr), is fused with 7.7 grams of lithium tetraborate ($Li_2B_4O_7$), and the melt is cast into a 40 mm button. The button is analyzed using a Philips PW1600 simultaneous x-ray fluorescence spectrometer. This system was calibrated using more than 40 reference materials, most of which are tabulated in Govindaraju, K. (July, 1989), Geostandards Newsletter, Vol. XIII. Counting time on major elements, such as silicon, aluminum, iron, or sodium, is 60 second and each element is determined through its own fixed channel. Loss on ignition data is obtained from the roasting mentioned. To accommodate the natural loss of hydration within the silica structure, the total silicon, aluminum, iron, and sodium contents for all examples can be reported on an ignited basis for their respective high oxides ($SiO_2$, $Al_2O_3$, $Fe_2O_3$, and $Na_2O$). As used herein, the term "on an ignited basis" reflects the pre-treatment of the sample by roasting at 950° C. in air for 1 hour prior to analysis.

In an alternative "pressed binder matrix" x-ray fluorescence method for determining total element content, a 3 grams diatomite sample (after roasting at 950° C. in air for 1 hr) is added to 0.75 grams of SPECTROBLEND (Registered Trademark, Chemplex) binder. The mixture is milled by shaking for 5 minutes in a tungsten carbide mixing vial with an impact ball. The resulting mixture is then pressed in a 31 mm die to 24,000 pounds per square inch (165 MPa) to form a pellet. Chemical composition is then determined using a Spectrace 6000 energy-dispersive x-ray fluorescence spectrometer operating under fundamental parameters, with calibration using six diatomite standards prepared in the same manner as samples. The instrument employs an electronically cooled Li(Si) detector and 50 kV rhodium target x-ray source, and is configured to result in sample excitation with approximately 50% deadtime. Peak intensities from spectra are analyzed by lineshape analysis comparison with single element reference spectra. Specifically, the $K_{alpha}$ peak intensities used for silicon, aluminum, and iron determinations correspond with energies of 1.740 keV, 1.487 keV, and 6.403 keV, respectively. The peak intensities for the diatomite standards are then converted into pure element count rates, which are used for determining element contents in samples, by peak intensity and data fitting. This method achieves results that are comparable to the aforementioned method for all elements except sodium, for which the relative error is significantly greater than for the fused tetraborate matrix method.

According to some embodiments, a filter aid composition may include a first acid-treated silica-based filter aid having a first particle size distribution and a second acid-treated silica-based filter aid having a second particle size distribution. The filter aid composition may have a multimodal particle size distribution such that the first particle size distribution has a $d_{50}$ greater than the second particle size distribution.

According to some embodiments, the filter aid composition may include from about 5 wt % to about 95 wt % of the first acid-treated silica-based filter aid. For example, the filter aid composition may include from about 15 wt % to about 85 wt %, from about 30 wt % to about 70 wt %, from about 40 wt % to about 60 wt %, from about 10 wt % to about 40 wt %, from about 60 wt % to about 90 wt %, or from about 45 wt % to about 55 wt % of the first acid-treated silica-based filter aid.

According to some embodiments, the filter aid composition may have a permeability in a range from about 0.005 Darcies to about 0.5 Darcies. For example, the filter aid composition may have a permeability in a range from about 0.05 Darcies to about 0.3 Darcies, 0.05 Darcies to about 0.1 Darcies, or from about 0.1 to about 0.2 Darcies.

According to some embodiments, the filter aid composition may have a conductivity of less than about 20 µS/cm. For example, the filter aid composition may have a conductivity in a range from about 0.01 to about 20 µS/cm, about 0.1 to about 15 µS/cm, or from about 0.1 to about 10 µS/cm.

According to some other embodiments, the filter aid composition may have a centrifuged wet density ranging from about 0.05 to about 0.5 g/cm$^3$, for example, ranging from about 0.1 to about 0.3 g/cm$^3$, or from about 0.1 to about 0.25 g/cm$^3$.

According to some embodiments, the first acid-treated silica-based filter aid may have a total soluble heavy metal content less than or equal to about 50 ppm as measured in accordance with the Japanese Standards for Food Additives test methodology (JSFA).

According to some embodiments, the first acid-treated silica-based filter aid may have a soluble iron content less than or equal to about 20 ppm (i.e., 20 mg Fe/kg filter aid). For example, the first acid-treated silica-based filter aid may have a soluble iron content less than or equal to about 15 ppm, less than or equal to about 10 ppm, less than or equal to about 8 ppm, less than or equal to about 7 ppm, or less than or equal to about 5 ppm. In some cases, the first acid-treated silica-based filter aid may have a soluble iron content less than or equal to about 3 ppm, less than or equal to about 2 ppm, less than or equal to about 1 ppm, or even less than or equal to about 0.5 ppm.

According to some embodiments, the first acid-treated silica-based filter aid may have a soluble aluminum content less than or equal to about 20 ppm (i.e., 20 mg Al/kg filter aid). For example, the first acid-treated silica-based filter aid may have a soluble aluminum content less than or equal to about 15 ppm, less than or equal to about 10 ppm, less than or equal to about 8 ppm, less than or equal to about 5 ppm, less than or equal to about 2 ppm, or even less than or equal to about 1 ppm.

According to some embodiments, the first acid-treated silica-based filter aid may have total silica content of greater than or equal to about 90% (w/w) SiO$_2$, such as, for example, greater than or equal to about 91% (w/w) SiO$_2$, greater than or equal to about 92% (w/w) SiO$_2$, greater than or equal to about 93% (w/w) SiO$_2$, greater than or equal to about 94% (w/w) SiO$_2$, greater than or equal to about 95% (w/w) SiO$_2$, greater than or equal to about 96% (w/w) SiO$_2$, greater than or equal to about 97% (w/w) SiO$_2$, greater than or equal to about 98% (w/w) SiO$_2$, greater than or equal to about 99% (w/w) SiO$_2$, or greater than or equal to 99.5% (w/w) SiO$_2$ reported on an ignited basis.

According to some embodiments, the first acid-treated silica-based filter aid may have a total iron content of less than or equal to about 1.5% (w/w) reported as Fe$_2$O$_3$, such as less than or equal to about 1.2% (w/w), less than or equal to about 1.0% (w/w), less than or equal to about 0.8% (w/w), less than or equal to about 0.6% (w/w), less than or equal to about 0.5% (w/w/), less than or equal to about 0.3% (w/w), less than or equal to about 0.2% (w/w), or less than or equal to about 0.1% (w/w) Fe$_2$O$_3$. In some examples, the first acid-treated silica-based filter aid may have a total iron content ranging from about 0.1% (w/w) to about 1.5% (w/w/), from about 0.2% (w/w) to about 1.0% (w/w), or from about 0.3% (w/w) to about 0.8% (w/w). In at least one example, the first acid-treated silica-based filter aid may have a total iron content ranging from about 0.005% (w/w) to about 0.3% (w/w) Fe$_2$O$_3$, such as less than or equal to about 0.2% (w/w) Fe$_2$O$_3$, reported on an ignited basis.

According to some embodiments, the first acid-treated silica-based filter aid may have a total aluminum content less than or equal to about 6.0% (w/w) reported as Al$_2$O$_3$, such as less than or equal to about 5.5% (w/w), less than or equal to about 5.0% (w/w), less than or equal to about 4.5% (w/w), less than or equal to about 4.0% (w/w), less than or equal to about 3.5% (w/w/), less than or equal to about 3.0% (w/w), less than or equal to about 2.5% (w/w), less than or equal to about 2.0% (w/w), less than or equal to about 1.5% (w/w), less than or equal to about 1.0% (w/w), less than or equal to about 0.5% (w/w), or less than or equal to about 0.3% (w/w) Al$_2$O$_3$. In some examples, the first acid-treated silica-based filter aid may have a total aluminum content ranging from about 0.01% (w/w) to about 6.0% (w/w/), from about 0.05% (w/w) to about 3.0% (w/w), or from about 0.1% (w/w) to about 1.0% (w/w). In at least one example, the first acid-treated silica-based filter aid may have a total iron content ranging from about 0.01% (w/w) to about 0.5% (w/w) Al$_2$O$_3$, such as from about 0.1% (w/w) to about 0.4% (w/w) Al$_2$O$_3$, reported on an ignited basis.

According to some embodiments, the second acid-treated silica-based filter aid may have a total soluble metal content less than or equal to about 50 ppm as measured in accordance with the Japanese Standards for Food Additives test methodology (JSFA).

According to some embodiments, the second acid-treated silica-based filter aid may have a soluble iron content less than or equal to about 20 ppm (i.e., 20 mg Fe/kg filter aid). For example, the second acid-treated silica-based filter aid may have a soluble iron content less than or equal to about 15 ppm, less than or equal to about 10 ppm, less than or equal to about 8 ppm, less than or equal to about 7 ppm, or less than or equal to about 5 ppm. In some cases, the second acid-treated silica-based filter aid may have a soluble iron content less than or equal to about 3 ppm, less than or equal to about 2 ppm, less than or equal to about 1 ppm, or even less than or equal to about 0.5 ppm.

According to some embodiments, the second acid-treated silica-based filter aid may have a soluble aluminum content less than or equal to about 20 ppm (i.e., 10 mg A/kg filter aid). For example, the second acid-treated silica-based filter aid may have a soluble aluminum content less than or equal to about 15 ppm, less than or equal to about 10 ppm, less than or equal to about 8 ppm, less than or equal to about 5 ppm, less than or equal to about 2 ppm, or even less than or equal to about 1 ppm.

According to some embodiments, the second acid-treated silica-based filter aid may have total silica content of greater than or equal to about 90% (w/w) $SiO_2$, such as, for example, greater than or equal to about 91% (w/w) $SiO_2$, greater than or equal to about 92% (w/w) $SiO_2$, greater than or equal to about 93% (w/w) $SiO_2$, greater than or equal to about 94% (w/w) $SiO_2$, greater than or equal to about 95% (w/w) $SiO_2$, greater than or equal to about 96% (w/w) $SiO_2$, greater than or equal to about 97% (w/w) $SiO_2$, greater than or equal to about 98% (w/w) $S1O_2$, greater than or equal to about 99% (w/w) $SiO_2$, or greater than or equal to 99.5% (w/w) $SiO_2$ reported on an ignited basis.

According to some embodiments, the second acid-treated silica-based filter aid may have a total iron content of less than or equal to about 1.5% (w/w) reported as $Fe_2O_3$, such as less than or equal to about 1.2% (w/w), less than or equal to about 1.0% (w/w), less than or equal to about 0.8% (w/w), less than or equal to about 0.6% (w/w), less than or equal to about 0.5% (w/w/), less than or equal to about 0.3% (w/w), less than or equal to about 0.2% (w/w), or less than or equal to about 0.1% (w/w) $Fe_2O_3$. In some examples, the second acid-treated silica-based filter aid may have a total iron content ranging from about 0.1% (w/w) to about 1.5% (w/w/), from about 0.2% (w/w) to about 1.0% (w/w), or from about 0.3% (w/w) to about 0.8% (w/w). In at least one example, the second acid-treated silica-based filter aid may have a total iron content ranging from about 0.005% (w/w) to about 0.3% (w/w) $Fe_2O_3$), such as less than or equal to about 0.2% (w/w) $Fe_2O_3$, reported on an ignited basis.

According to some embodiments, the second acid-treated silica-based filter aid may have a total aluminum content less than or equal to about 6.0% (w/w) reported as $Al_2O_3$, such as less than or equal to about 5.5% (w/w), less than or equal to about 5.0% (w/w), less than or equal to about 4.5% (w/w), less than or equal to about 4.0% (w/w), less than or equal to about 3.5% (w/w), less than or equal to about 3.0% (w/w), less than or equal to about 2.5% (w/w), less than or equal to about 2.0% (w/w), less than or equal to about 1.5% (w/w), less than or equal to about 1.0% (w/w), less than or equal to about 0.5% (w/w), or less than or equal to about 0.3% (w/w) $Al_2O_3$. In some examples, the second acid-treated silica-based filter aid may have a total aluminum content ranging from about 0.01% (w/w) to about 6.0% (w/w), from about 0.05% (w/w) to about 3.0% (w/w), or from about 0.1% (w/w) to about 1.0% (w/w). In at least one example, the second acid-treated silica-based filter aid may have a total iron content ranging from about 0.01% (w/w) to about 0.5% (w/w) $Al_2O_3$, such as from about 0.1% (w/w) to about 0.4% (w/w) $Al_2O_3$, reported on an ignited basis.

According to some embodiments, the filter aid composition may have a filtration flux rate in a range from about 0.1 $L/m^2$-min to about 45 $L/m^2$-min. For example, the filter aid composition may have a filtration flux rate ranging from about 1 $L/m^2$-min to about 15 $L/m^2$-min, from about 10 $L/m^2$-min to about 30 $L/m^2$-min, or from about 25 $L/m^2$-min to about 45 $L/m^2$-min.

According to some embodiments, the filter aid composition may have a pressure differential less than about 4.0 bar after 1 hour of filtration at 1.0 g/L. For example, the filter aid composition may have a pressure differential less than about 3.5 bar after 1 hour of filtration at 1.0 g/L or less than about 3.0 bar after 1 hour of filtration at 1.0 g/L.

According to some embodiments, the filter aid composition may have a pressure differential less than about 6.0 bar after 2 hours of filtration at 1.0 g/L. For example, the filter aid composition may have a pressure differential less than about 5.5 bar after 2 hours of filtration at 1.0 g/L, less than about 5.0 bar after 2 hours of filtration at 1.0 g/L, or less than about 4.5 bar after 2 hours of filtration at 1.0 g/L.

According to some embodiments, a method of making a filter aid composition may include providing a first silica-based filter aid having a first particle size distribution, providing a second silica-based filter aid having a second particle size distribution, and blending the first silica-based filter aid with the second silica-based filter aid to form the filter aid composition. The filter aid composition may have a multimodal particle size distribution such that the first particle size distribution has a $d_{50}$ greater than the second particle size distribution. The first silica-based filter aid and the second silica-based filter aid may include acid-treated filter aids.

According to some embodiments, the method may include acid-treating the first silica-based filter aid composition prior blending with the second silica-based filter aid composition. According to some embodiments, the acid may be selected from the group consisting of oxalic acid, glacial acetic acid, citric acid, malic acid, tartaric acid, ascorbic acid, and mixtures thereof.

According to some embodiments, the method may include acid-treating the second silica-based filter aid composition prior blending with the first silica-based filter aid composition.

According to some embodiments, the method may include acid-treating the filter aid composition after blending the first silica-based filter aid with the second silica-based filter aid.

According to some embodiments, the particle size distribution of the filter aid composition may have a multimodal particle size distribution, such as, for example, a bimodal or trimodal particle size distribution.

According to some embodiments, the fluid may be a beverage composition. According to some embodiments, the fluid may include green tea.

According to some embodiments, a method of preparing a filter aid may include providing a first silica-based filter aid composition, providing a first acid composition selected from the group of oxalic acid and glacial acetic acid, and extracting soluble metals from the first silica-based filter aid composition using the first acid composition.

According to some embodiments, the method may include providing a second silica-based filter aid composition, providing a second acid composition selected from the group of oxalic acid and glacial acetic acid, and extracting soluble metals from the second silica-based filter aid composition using the second acid composition.

According to some embodiments, the first acid composition and the second acid composition include the same acid.

According to some embodiments, extracting soluble metals from the first silica-based filter aid composition and extracting soluble metals from the second silica-based filter aid composition occurs at the same time.

According to some embodiments, the first acid-treated silica-based filter aid composition may have a total soluble metal content less than or equal to about 50 ppm. According to some embodiments, the first acid-treated silica-based filter aid composition may have a soluble iron content less than or equal to about 20 ppm (e.g., greater than 0 and less than 20 ppm), such as a soluble iron content ranging from about 0.1% ppm to about 15 ppm, from about 0.2% ppm to about 10 ppm, or from about 0.3% ppm to about 5 ppm. According to some embodiments, the first acid-treated silica-based filter aid composition may have a soluble aluminum content less than or equal to about 20 ppm (e.g., greater than 0 and less than 20 ppm), such as a soluble aluminum content ranging from about 0.1% ppm to about 15 ppm, from about 0.2% ppm to about 10 ppm, or from about 0.3% ppm to about 5 ppm.

According to some embodiments, the second acid-treated silica-based filter aid composition may have a total soluble metal content less than or equal to about 50 ppm. According to some embodiments, the second acid-treated silica-based filter aid composition may have a soluble iron content less than or equal to about 20 ppm (i.e., 20 mg Fe/kg filter aid), such as a soluble iron content ranging from about 0.1% ppm to about 15 ppm, from about 0.2% ppm to about 10 ppm, or from about 0.3% ppm to about 5 ppm. According to some embodiments, the second acid-treated silica-based filter aid composition may have a soluble aluminum content less than or equal to about 20 ppm (e.g., greater than 0 and less than 20 ppm), such as a soluble aluminum content ranging from about 0.1% ppm to about 15 ppm, from about 0.2% ppm to about 10 ppm, or from about 0.3% ppm to about 5 ppm.

According to some embodiments, the first acid-treated silica-based filter aid composition may have a dr in a range from about 10 μm to about 50 μm, such as, for example, from about 15 μm to about 30 μm, or from about 15 μm to about 25 μm.

According to some embodiments, the second acid-treated silica-based filter aid composition may have a $d_{50}$ in a range from about 0.5 μm to about 15 μm, such as, for example, from about 2 μm to about 10 μm, or from about 5 μm to about 10 μm.

According to some embodiments, the first silica-based filter aid can have a median pore size larger than that of the second silica-based filter aid. For example, the first silica-based filter aid may have a median pore size ranging from about 1 μm to about 5 μm, and the second silica-based filter aid may have a $d_{50}$ in a range from about 0.1 μm to about 1 μm.

Silica-Based Filter Aids

Although specific embodiments may be discussed in terms of diatomite, it is understood that the silica-based filter aid may include one or more silica-based filtration materials, such as, biogenic silica, natural glasses, perlite, pumice, volcanic ash, calcined kaolin, smectite, mica, talc, shirasu, obsidian, pitchstone, rice hull ash, and combinations thereof. According to some embodiments, the silicate substrate may include biogenic silica. According to some embodiments, the silicate substrate may include diatomite.

The term "biogenic silica," as used herein, refers to silica produced or brought about by living organisms. One example of biogenic silica is diatomite, which is obtained from diatomaceous earth (also known as "DE" or "kleseguhr"). Diatomite is a sediment enriched in biogenic silica in the form of the siliceous frustules (i.e., shells or skeletons) of diatoms. Diatoms are a diverse array of microscopic, single-celled algae of the class Bacillatiophyceae, which possess an ornate siliceous skeletons or frustules of varied and intricate structure including two valves which, in the living diatom, fit together much like a pill box. Diatomite may form from the remains of water-borne diatoms and, therefore, diatomite deposits may be found close to either current or former bodies of water. Those deposits are generally divided into two categories based on source: freshwater and saltwater. Freshwater diatomite is generally mined from dry lakebeds and may be characterized as having a low crystalline silica content and a high iron content. In contrast, saltwater diatomite is generally extracted from oceanic areas and may be characterized as having a high crystalline silica content and a low iron content. The morphology of the diatom frustules may vary widely among species and serves as the basis for taxonomic classification; at least 2,000 distinct species are known. The surface of each valve is punctuated by a series of openings that include the complex fine structure of the frustule and impart a design that is distinctive to individual species. The size of typical frustules may be in a range from about 0.75 μm to about 1000 μm. In some embodiments, the size of the frustules may be in a range from about 10 μm to about 150 μm. The frustules in this size range may be sufficiently durable to retain much of their porous and intricate structure virtually intact through long periods of geologic time when preserved in conditions that maintain chemical equilibrium.

Other sources of biogenic silica include plants, animals, and microorganisms, which may provide concentrated sources of silica with unique characteristics. For example, rice hulls contain sufficient silica that they can be commercially ashed for their siliceous residue, a product commonly known as "rice hull ash." Certain sponges are also concentrated sources of silica, the remnants of which may be found in geologic deposits as acicular spicules.

The term "natural glass," as used herein, refers to natural glasses, which may also be referred to as "volcanic glasses," that are formed by the rapid cooling of siliceous magma or lava. Several types of natural glasses are known, including, for example, perlite, pumice, pumicite, obsidian, and pitchstone. Volcanic glasses, such as perlite and pumice, occur in massive deposits and find wide commercial use. Volcanic ash, often referred to as "tuff" when in consolidated form, includes small particles or fragments that may be in glassy form. As used herein, the term "natural glass" encompasses volcanic ash.

Natural glasses may be chemically equivalent to rhyolite. Natural glasses that are chemically equivalent to trachyte, dacite, andesite, latite, and basalt are also known, but may be less common. The term "obsidian" is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated natural glass that may contain, for example, about 72% to about 75% $SiO_2$ by weight, about 12% to about 14% $Al_2O_3$ by weight, about 0.5% to about 2% $Fe_2O_3$ by weight, about 3% to about 5% $Na_2O$ by weight, about 4 to about 5% $K_2O$ by weight, about 0.4% to about 1.5% CaO by weight, and small amounts of other metallic elements. Perlite may be distinguished from other natural glasses by a relatively higher content (such as about 2% to about 5% by weight) of chemically-bonded water, the presence of a vitreous, pearly luster, and characteristic concentric or arcuate onion skin-like (i.e., perlitic) fractures. Perlite products may be prepared by milling and thermal expansion, and may possess unique physical properties such as high porosity, low bulk density, and chemical inertness. "Perlite," as used herein, also includes expanded perlite.

Talc is magnesium silicate mineral, a mineral chlorite (magnesium aluminum silicate), or a mixture of the two. Talc may be optionally associated with other minerals, for example, dolomite and/or magnesite. Talc also includes synthetic talc, also known as talcose. In particular embodiments, the talc may be a macro or microcrystalline talc. The individual platelet size, i.e., the median diameter as measured by the Sedigraph method, of an individual talc platelet (a few thousand elementary sheets) can vary from approximately 1 μm to over 100 μm, depending on the conditions of formation of the deposit. The individual platelet size determines the lamellarity of the talc. A highly lamellar talc will have large individual platelets, whereas a microcrystalline talc will have small platelets. Although all talcs may be termed lamellar, their platelet size differs from one deposit to another. Small crystals provide a compact, dense ore, known as "microcrystalline talc." Large crystals come in papery layers, known as "macrocrystalline talc." Known microcrystalline talc deposits are located in Montana (Yellowstone) and in Australia (Three Springs). In a microcrystalline structure, talc elementary particles are composed of small plates compared to macrocrystalline structures, which are composed of larger plates.

Pumice is a natural glass characterized by a mesoporous structure (e.g., having pores or vesicles, sometimes having pore sizes up to about 1 mm). The porous nature of pumice gives it a very low apparent density, in many cases allowing it to float on the surface of water. Most commercial pumice contains from about 60% to about 70% $SiO_2$ by weight. Pumice may be processed by milling and classification, and products may be used as lightweight aggregates and also as abrasives, adsorbents, and fillers. Unexpanded pumice and thermally-expanded pumice may also be used as filtration components.

Blends of Silica-Based Filter Aids

According to some embodiments, a filter aid composition may be prepared by blending two separate silica-based filter aid compositions. For example, a filter aid composition may include a first silica-based filter aid having a first particle size distribution and a second silica-based filter aid having a second particle size distribution. The first silica-based filter aid composition and second silica-based filter aid composition may be acid-treated filter aids.

The filter aid composition may have a multimodal particle size distribution such that the first particle size distribution has a $d_{50}$ greater than the second particle size distribution. According to some embodiments, the filter aid composition may have a multimodal distribution, such as, for example, a bimodal or trimodal distribution.

According to some embodiments, the first particle size distribution has a $d_{50}$ greater than the second particle size distribution. For example, the first particle size distribution may have a $d_{50}$ in a range from about 10 μm to about 50 μm, such as for example from about 15 μm to about 30 μm or from about 15 μm to about 25 μm, and the second particle size distribution may have a $d_{50}$ in a range from about 0.5 μm to about 15 μm, such as for example about 2 μm to about 10 μm or from about 5 μm to about 10 μm. Further, for example, the first particle distribution may have a $d_{10}$ ranging from about 5 μm to about 20 μm, such as from about 5 μm to about 10 μm, and/or may have a $d_{30}$ ranging from about 60 μm to about 90 μm, such as from about 70 μm to about 85 μm. In some examples, the second particle distribution may have a $d_{10}$ ranging from about 1 μm to about 5 μm, such as from about 2 μm to about 3 μm, and/or may have a $d_{90}$ ranging from about 15 μm to about 30 μm, such as from about 20 μm to about 25 μm.

According to another aspect, the first particle size distribution may have a $d_{50}$ of at least 5 μm greater than the $d_{50}$ of the second particle size distribution. For example, the first particle size distribution may have a $d_{50}$ of at least about 10 μm larger than the $d_{50}$ of the second particle size distribution. In another aspect, the first particle size distribution may have a $d_{50}$ ranging from about 5 μm to about 40 μm larger than the $d_{50}$ of the second particle size distribution, such as, for example, in the range of about 5 μm to about 20 μm, from about 5 μm to about 15 μm, or from about 5 μm to about 10 μm larger than the $d_{50}$ of the second particle size distribution.

According to some embodiments, the first silica-based filter aid may have a median pore size larger than that of the second silica-based filter aid. For example, the first silica-based filter aid may have a median pore size ranging from about 1 μm to about 5 μm, and the second silica-based filter aid may have a median pore size ranging from about 0.1 μm to about 1 μm.

According to some embodiments, the filter aid composition may include from about 5 wt % to about 95 wt % of the first acid-treated silica-based filter aid. For example, the filter aid composition may include from about 40 wt % to about 95 wt %, from about 60 wt % to about 90 wt %, from about 70 wt % to about 95 wt %, from about 65 wt % to about 75 wt %, from about 75 wt % to about 85 wt %, or from about 85 wt % to about 95 wt % of the first acid-treated silica-based filter aid.

Acid Treatments

According to some embodiments, the silica-based filter-aids may be treated with at least one acid. For example, the silica-based filter-aid may be treated with at least one mild acid, such as, for example, oxalic acid, glacial acetic acid, citric acid, malic acid, tartaric acid, ascorbic acid, and mixtures thereof. The acid treatment may be performed by mixing the silica-based filter-aid with the acid or with a mixture of acid and water. According to some embodiments, the acid treatment may include spraying the acid or the mixture of acid and water onto the silica-based filter-aid. According to some embodiments, the mixture of silica-based filter-aid and acid, or silica-based filter-aid, acid, and water, may be mixed during or after the acid is added.

According to some embodiments, the acid-treated silica-based filter-aid may be dried after the acid treatment. Drying may occur in an oven and may be for one or more hours, or overnight. For example, the acid-treated silica-based filter-aid may be dried at a temperature greater than or equal to about 70° C., greater than or equal to about 80° C., greater than or equal to about 90° C., or greater than or equal to about 100° C. For example, the drying may occur in a range from about 70° C. to about 120° C., such as, for example, in a range from about 80° C. to about 110° C., from about 90° C. to about 110° C., from about 90° C. to about 100° C., or from about 100° C. to about 110° C.

The amount of acid in the treatment may be greater than or equal to about 5% by weight relative to the total weight of the silica-based filter-aid and the acid combined, such as, for example, greater than or equal to about 7% by weight, greater than or equal to about 8% by weight, greater than or equal to about 9% by weight, greater than or equal to about 10% by weight, greater than or equal to about 11% by weight, greater than or equal to about 12% by weight, greater than or equal to about 13% by weight, greater than or equal to about 14% by weight, greater than or equal to about 15% by weight, greater than or equal to about 16% by weight, greater than or equal to about 17% by weight, greater than or equal to about 18% by weight, greater than or equal to about 19% by weight, or greater than or equal to about 20% by weight relative to the total weight of the acid and the silica-based filter-aid combined.

Where a mixture of water and acid is used to treat the silica-based filter-aid, the amount of acid in the treatment may be greater than or equal to about 5% by weight relative to the total weight of the silica-based filter-aid, the acid, and the water combined, such as, for example, greater than or equal to about 7% by weight, greater than or equal to about 8% by weight, greater than or equal to about 9% by weight, greater than or equal to about 10% by weight, greater than or equal to about 11%, by weight, greater than or equal to about 12% by weight, greater than or equal to about 13% by weight, greater than or equal to about 14% by weight, greater than or equal to about 15% by weight, greater than or equal to about 16% by weight, greater than or equal to about 17% by weight, greater than or equal to about 18% by weight, greater than or equal to about 19% by weight, or greater than or equal to about 20% by weight relative to the total weight of the silica-based filter-aid, the acid, and the water combined. The amount of water and acid in the treatment may be greater than or equal to about 5% by weight relative to the total weight of the silica-based filter-aid, the acid, and the water combined, such as, for example, greater than or equal to about 8% by weight, greater than or equal to about 10% by weight, greater than or equal to about 11% by weight, greater than or equal to about 12% by weight, greater than or equal to about 13% by weight, greater than or equal to about 14% by weight, greater than or equal to about 15% by weight, greater than or equal to about 16% by weight, greater than or equal to about 17% by weight, greater than or equal to about 18% by weight, greater than or equal to about 19% by weight, greater than or equal to about 20% by weight, greater than or equal to about 22% by weight, or greater than or equal to about 24% by weight relative to the total weight of the silica-based filter-aid, the acid, and the water combined.

Without wishing to be bound by a particular theory, it is believed that the acid treatment reacts with the silica-based filter-aid to remove soluble metals from the silica-based filter-aid.

According to some embodiments, treating the silica-based filter-aid with acid may also increase the flow rate and/or adsorption of impurities, such as sediments in green tea or beer. Mixtures of acid and water to treat the silica-based filter-aid may be further used to specifically tailor the flow rate and adsorption properties of the acid-treated silica-based filter-aid. For example, such treatments may lower the wet density of the acid-treated silica-based filter-aid. Such treatments may also eliminate the need for a drying step, which may reduce production costs.

According to some embodiments, acid treatment may occur prior to or after blending the silica-based filter aids into a filter aid composition. When acid treatment occurs prior to blending, the choice of acid may be used to specifically tailor the properties of each filter aid composition or may be selected as particularly suitable for the type of silica-based material of the filter aid. The acid-treated filter aids may provide acceptable or improved filtration properties while reducing the costs to prepare the filter aids.

As used herein, an acid-treated filter aid refers to a filter aid that has been acid-treated either before blending, after blending, or both.

According to some embodiments, the filter aid composition having a first acid-treated filter aid and a second acid-treated filter aid may have a bimodal distribution. A bimodal distribution of particle sizes includes one distribution corresponding the first acid-treated filter aid and the other distribution corresponding the second distribution.

According to some embodiments, the filter aid composition may have a multimodal particle size distribution, which may be a bimodal or trimodal distribution, although higher order particle size distributions are also contemplated. In a multimodal distribution, each peak or mode corresponds to one silica-based filter aid in the filter aid composition.

Without wishing to be bound to a particular theory, it is believed that a broader particle size distribution of the blended filter aid composition results in a broader pore size distribution. As a result, when sediment being removed by the filter aid composition may block or close off pores in its respective size range, additional pores of larger and smaller size remain in the resulting filter aid composition. The remaining pores continue to have interconnected pathways to allow for liquid flow and continued filtration of sediment. Because of the increased pore size distribution, the flow resistance may be lowered for the same degree of filtrate clarification at any given flux rate.

The filtration performance of the filter aid compositions may be shown by a lower differential pressure at equal throughput of the filter aid composition. The results of filtration may also be compared by filtrate clarity and usage of the filtered liquid versus a single control composition with comparable permeability. For example, the exemplary filter aid compositions may exhibit better filtration performance based on a combination of filtration rate and filtration results than either of the constituent filter aid components.

The following examples are intended to illustrate aspects of the present disclosure without, however, being limiting in nature. It is understood that the present disclosure encompasses additional embodiments consistent with the foregoing description and following examples.

EXAMPLES

Example 1

Exemplary filter aid compositions were prepared by blending coarse acid-treated diatomite having a $d_5$ of about 20 μm and a median pore size of about 2.5 μm with fine acid-treated diatomite having a $d_{60}$ of about 7 μm and a median pore size of about 0.5 μm. A control composition of fine acid-treated diatomite having a $d_{50}$ of about 20 μm and a median pore size of about 2.5 μm was also prepared. Table 1 shows the ratios of fine and coarse diatomite in the blends.

TABLE 1

| Sample | Fine diatomite (wt %) | Coarse Diatomite (wt %) |
| --- | --- | --- |
| Control | 100 | 0 |
| A | 90 | 10 |
| B | 85 | 15 |
| C | 80 | 20 |
| D | 35 | 65 |

Each of the control sample and Samples A-D were then used to filter ITO-EN® green tea (Oi Ocha). A peristaltic pump was used to maintain a flow rate of 20 ml/min for each sample and a filtration flux rate of 4.00 L/m²-min. The permeability of each filter aid composition was 0.11 Darcies. The filtration aids were supplied with a body feed at either 1.0 g/L or 1.4 g/L of filtered liquid. Tables 2-7 show the total flow rate, pressures, and Hatch turbidity (NTU) of the control sample and exemplary filter aids over time.

TABLE 2

Control at 1.0 g/L Body Feed

| Time (hr) | Body Feed Usage (g/L) | Total Flow Liters | Total Flow Gallons | Differential Pressure (bar) | Clarity (NTU) |
|---|---|---|---|---|---|
| 0.0000 | 0.0000 | 0.00 | 0.000 | 1.75 | 0.06 |
| 0.0833 | 0.1000 | 0.10 | 0.026 | 1.75 | |
| 0.1667 | 0.2000 | 0.20 | 0.053 | 1.75 | 0.19 |
| 0.4167 | 0.5000 | 0.50 | 0.132 | 2.00 | |
| 0.5000 | 0.6000 | 0.60 | 0.159 | 2.00 | 0.13 |
| 0.7500 | 0.9000 | 0.90 | 0.238 | 2.25 | |
| 1.0000 | 1.2000 | 1.20 | 0.317 | 2.50 | 0.22 |
| 1.2500 | 1.5000 | 1.50 | 0.396 | 2.75 | |
| 1.5000 | 1.8000 | 1.80 | 0.476 | 3.00 | 0.17 |
| 2.0000 | 2.4000 | 2.40 | 0.634 | 3.50 | 0.17 |
| 2.2500 | 2.7000 | 2.70 | 0.713 | 3.75 | |
| 2.5000 | 3.0000 | 3.00 | 0.793 | 4.00 | 0.15 |

TABLE 3

Sample A at 1.0 g/L Body Feed

| Time (hr) | Body Feed Usage (g/L) | Total Flow Liters | Total Flow Gallons | Differential Pressure (bar) | Clarity (NTU) |
|---|---|---|---|---|---|
| 0.0000 | 0.0000 | 0.00 | 0.000 | 1.00 | 0.07 |
| 0.0833 | 0.1000 | 0.10 | 0.026 | 1.00 | |
| 0.1667 | 0.2000 | 0.20 | 0.053 | 1.00 | 0.21 |
| 0.2500 | 0.3000 | 0.30 | 0.079 | 1.25 | 0.17 |
| 0.3333 | 0.4000 | 0.40 | 0.106 | 1.50 | 0.13 |
| 0.4167 | 0.5000 | 0.50 | 0.132 | 1.75 | 0.24 |
| 0.5000 | 0.6000 | 0.60 | 0.159 | 2.00 | 0.18 |
| 0.7500 | 0.9000 | 0.90 | 0.238 | 2.25 | 0.19 |
| 1.0000 | 1.2000 | 1.20 | 0.317 | 2.75 | 0.18 |
| 1.2500 | 1.5000 | 1.50 | 0.396 | 3.50 | 0.18 |
| 1.5000 | 1.8000 | 1.80 | 0.476 | 4.25 | 0.18 |
| 1.7500 | 2.1000 | 2.10 | 0.555 | 5.00 | 0.17 |

TABLE 4

Sample B at 1.0 g/L Body Feed

| Time (hr) | Body Feed Usage (g/L) | Total Flow Liters | Total Flow Gallons | Differential Pressure (bar) | Clarity (NTU) |
|---|---|---|---|---|---|
| 0.0000 | 0.0000 | 0.00 | 0.000 | 0.50 | 0.10 |
| 0.0833 | 0.1000 | 0.10 | 0.026 | 0.50 | |
| 0.1667 | 0.2000 | 0.20 | 0.053 | 0.50 | 0.21 |
| 0.2500 | 0.3000 | 0.30 | 0.079 | 0.50 | 0.16 |
| 0.3333 | 0.4000 | 0.40 | 0.106 | 0.75 | 0.12 |
| 0.4167 | 0.5000 | 0.50 | 0.132 | 1.00 | 0.10 |
| 0.5000 | 0.6000 | 0.60 | 0.159 | 1.25 | 0.21 |
| 0.7500 | 0.9000 | 0.90 | 0.238 | 1.75 | 0.18 |
| 1.0000 | 1.2000 | 1.20 | 0.317 | 2.25 | 0.15 |
| 1.2500 | 1.5000 | 1.50 | 0.396 | 2.75 | 0.19 |
| 1.5000 | 1.8000 | 1.80 | 0.476 | 3.25 | 0.15 |
| 1.7500 | 2.1000 | 2.10 | 0.555 | 4.00 | 0.15 |

TABLE 5

Sample B at 1.4 g/L Body Feed

| Time (hr) | Body Feed Usage (g/L) | Total Flow Liters | Total Flow Gallons | Differential Pressure (bar) | Clarity (NTU) |
|---|---|---|---|---|---|
| 0.0000 | 0.0000 | 0.00 | 0.000 | 1.75 | 0.07 |
| 0.0833 | 0.1400 | 0.10 | 0.026 | 1.75 | |
| 0.1667 | 0.2800 | 0.20 | 0.053 | 1.75 | 0.17 |
| 0.2500 | 0.4200 | 0.30 | 0.079 | 2.00 | 0.14 |
| 0.3333 | 0.5600 | 0.40 | 0.106 | 2.25 | 0.12 |
| 0.4167 | 0.7000 | 0.50 | 0.132 | 2.25 | 0.10 |
| 0.5000 | 0.8400 | 0.60 | 0.159 | 2.25 | 0.21 |
| 0.7500 | 1.2600 | 0.90 | 0.238 | 2.50 | 0.21 |
| 1.0000 | 1.6800 | 1.20 | 0.317 | 3.00 | 0.17 |
| 1.2500 | 2.1000 | 1.50 | 0.396 | 3.25 | 0.17 |
| 1.5000 | 2.5200 | 1.80 | 0.476 | 3.75 | 0.16 |
| 1.7500 | 2.9400 | 2.10 | 0.555 | 4.00 | 0.16 |
| 2.0000 | 3.3600 | 2.40 | 0.634 | 4.25 | 0.17 |
| 2.2500 | 3.7800 | 2.70 | 0.713 | 4.75 | 0.15 |
| 2.5000 | 4.2000 | 3.00 | 0.793 | 5.25 | 0.15 |
| 2.7500 | 4.6200 | 3.30 | 0.872 | 5.75 | 0.17 |
| 3.0000 | 5.0400 | 3.60 | 0.951 | 6.25 | 0.15 |
| 3.2500 | 5.4600 | 3.90 | 1.030 | 6.75 | 0.13 |
| 3.3500 | 5.6280 | 4.02 | 1.062 | 7.00 | 0.13 |

TABLE 6

Sample C at 1.0 g/L Body Feed

| Time (hr) | Body Feed Usage (g/L) | Total Flow Liters | Total Flow Gallons | Differential Pressure (bar) | Clarity (NTU) |
|---|---|---|---|---|---|
| 0.0000 | 0.0000 | 0.00 | 0.000 | 0.50 | 0.05 |
| 0.0833 | 0.1000 | 0.10 | 0.026 | 0.50 | |
| 0.1667 | 0.2000 | 0.20 | 0.053 | 0.50 | 0.34 |
| 0.2500 | 0.3000 | 0.30 | 0.079 | 0.50 | |
| 0.3333 | 0.4000 | 0.40 | 0.106 | 0.50 | 0.19 |
| 0.4167 | 0.5000 | 0.50 | 0.132 | 0.75 | |
| 0.5000 | 0.6000 | 0.60 | 0.159 | 0.75 | 0.17 |
| 0.7500 | 0.9000 | 0.90 | 0.238 | 1.25 | 0.14 |
| 1.0000 | 1.2000 | 1.20 | 0.317 | 3.00 | 0.12 |
| 1.2500 | 1.5000 | 1.50 | 0.396 | 4.00 | 0.14 |
| 1.5000 | 1.8000 | 1.80 | 0.476 | 5.00 | 0.17 |
| 1.7500 | 2.1000 | 2.10 | 0.555 | 6.00 | 0.15 |

TABLE 7

Sample D at 1.0 g/L Body Feed

| Time (hr) | Body Feed Usage (g/L) | Total Flow Liters | Total Flow Gallons | Differential Pressure (bar) | Clarity (NTU) |
|---|---|---|---|---|---|
| 0.0000 | 0.0000 | 0.00 | 0.000 | 1.75 | 0.12 |
| 0.0833 | 0.1000 | 0.10 | 0.026 | 1.75 | |
| 0.1667 | 0.2000 | 0.20 | 0.053 | 1.75 | 0.28 |
| 0.2500 | 0.3000 | 0.30 | 0.079 | 1.75 | |
| 0.3333 | 0.4000 | 0.40 | 0.106 | 2.00 | |
| 0.4167 | 0.5000 | 0.50 | 0.132 | 2.25 | |
| 0.5000 | 0.6000 | 0.60 | 0.159 | 2.50 | 0.10 |
| 0.7500 | 0.9000 | 0.90 | 0.238 | 3.00 | 0.11 |
| 1.0000 | 1.2000 | 1.20 | 0.317 | 3.75 | 0.11 |
| 1.2500 | 1.5000 | 1.50 | 0.396 | 4.75 | 0.12 |
| 1.5000 | 1.8000 | 1.80 | 0.476 | 5.75 | 0.11 |
| 1.7500 | 2.1000 | 2.10 | 0.555 | 6.75 | 0.11 |

Figure 1:
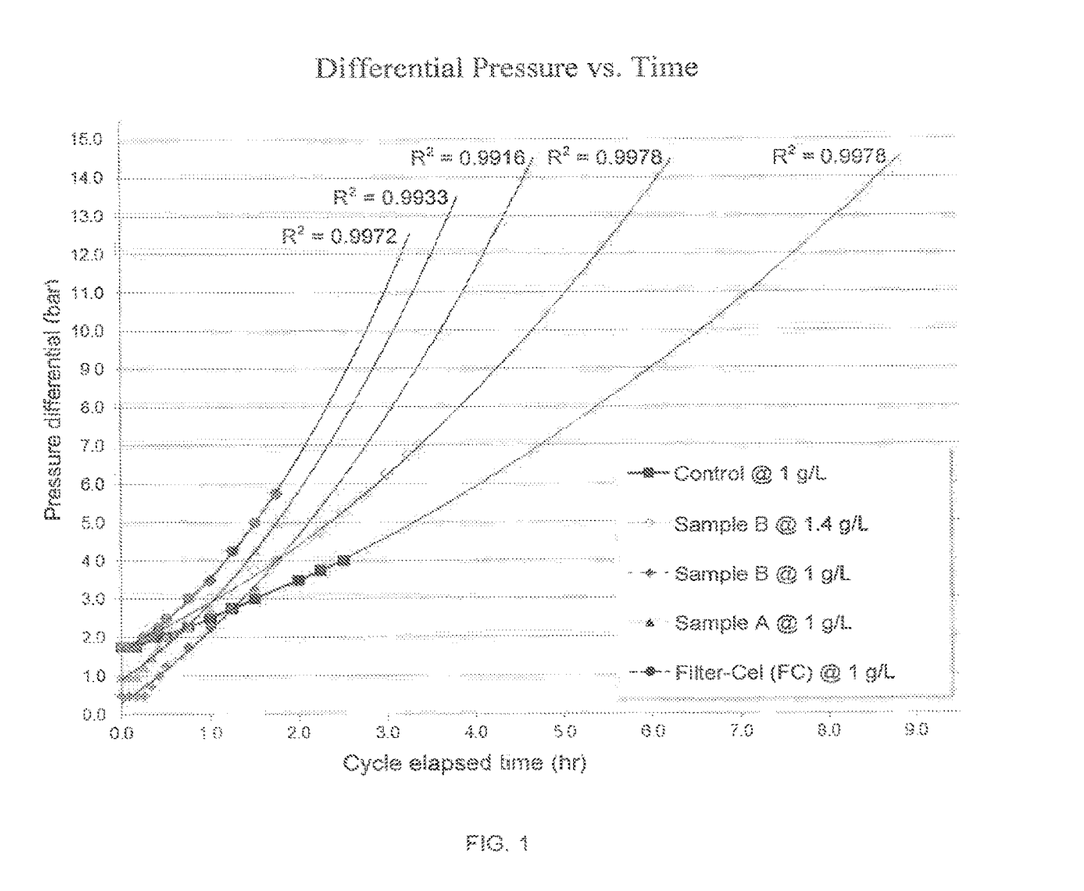
FIG. 1 shows a graph of the differential pressure versus time of exemplary filter aids.

FIG. 1 shows a graph of the differential pressures over time of the control sample, Samples A and B at 1.0 g/L body feed, and Sample B at 1.4 g/L body feed.

Figure 2:
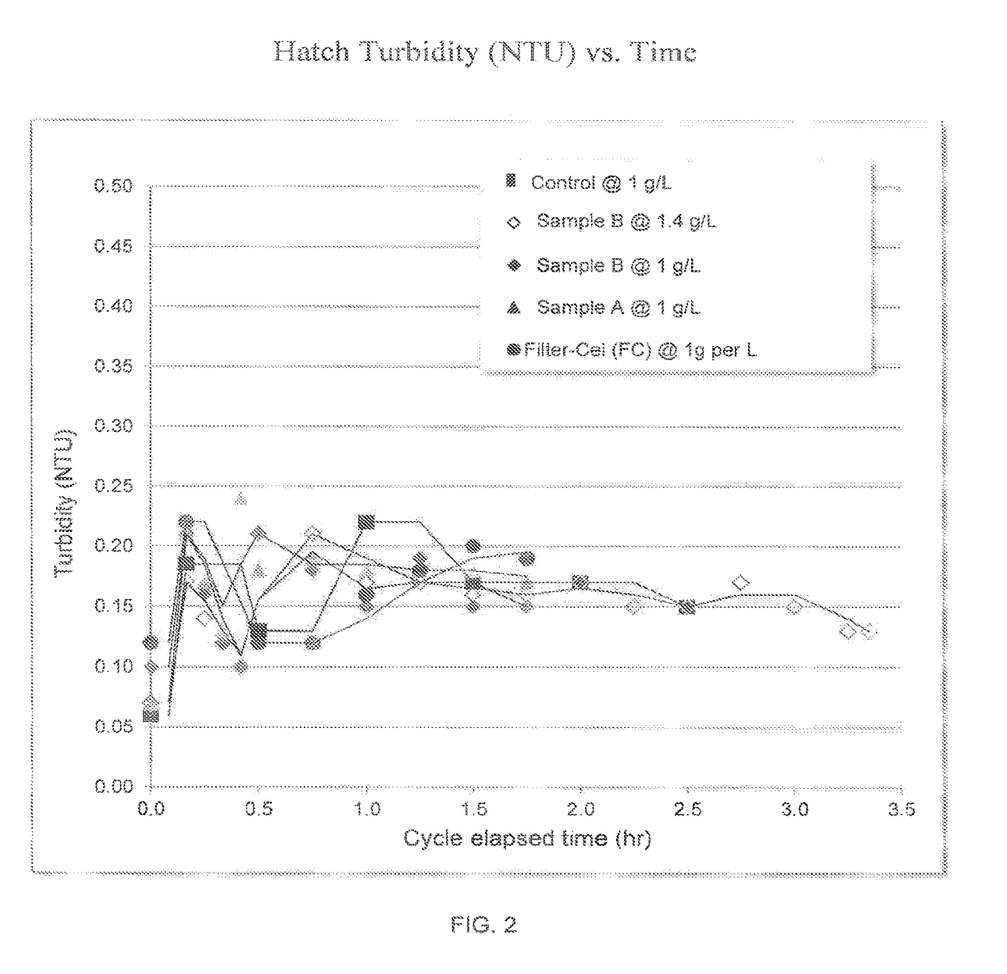
FIG. 2 shows a graph of the Hatch turbidity versus time of exemplary filter aids.

FIG. 2 shows a graph of the Hatch turbidity (NTU) over time of the control sample, Samples A and B at 1.0 g/L body feed, and Sample B at 1.4 g/L body feed.

Example 2

The particle size distribution of samples of coarse diatomite (DE2) and fine diatomite (DE1) used to prepare the filter aid compositions of Example 1 were measured and are reported in Table 8.

TABLE 8

|  | DE 2 (lot 1) | DE 2 (lot 2) | DE 2 (lot 3) | DE 2 (lot 4) | DE 1 (lot 1) | DE 1 (lot 2) | DE 1 (lot 3) | DE 1 (lot 4) |
|---|---|---|---|---|---|---|---|---|
| $d_{10}$ (μm) | 7.0 | 7.4 | 6.8 | 5.4 | 2.7 | 2.9 | 2.8 | 2.3 |
| $d_{20}$ (μm) | 10.9 | 11.5 | 10.4 | 7.9 | 3.8 | 4.0 | 3.9 | 3.3 |
| $d_{30}$ (μm) | 15.4 | 16.1 | 14.6 | 11.0 | 4.9 | 5.2 | 5.1 | 4.2 |
| $d_{40}$ (μm) | 20.0 | 21.0 | 18.9 | 14.8 | 6.1 | 6.4 | 6.3 | 5.3 |
| $d_{50}$ (μm) | 25.6 | 27.0 | 24.0 | 18.9 | 7.5 | 7.9 | 7.7 | 6.5 |
| $d_{60}$ (μm) | 33.2 | 35.1 | 30.6 | 23.9 | 9.2 | 9.7 | 9.5 | 8.1 |
| $d_{70}$ (μm) | 43.3 | 45.6 | 39.6 | 31.0 | 11.9 | 12.4 | 12.2 | 10.4 |
| $d_{80}$ (μm) | 56.0 | 59.7 | 51.7 | 42.1 | 16.5 | 16.6 | 16.3 | 13.9 |
| $d_{90}$ (μm) | 76.8 | 84.5 | 71.8 | 62.4 | 26.4 | 24.8 | 24.6 | 20.5 |
| $d_{95}$ (μm) | 100.4 | 113.6 | 95.6 | 86.1 | 41.0 | 36.1 | 36.1 | 28.5 |

Example 3

The following describes the procedure for determining the amount of soluble iron in a filter aid sample (e.g., diatomite material or mixture of diatomite materials).

Prepare a citric acid/ethanol solution by dissolving 4.6 g of citric acid monohydrate in approximately 500 ml deionized water in a 1000-ml volumetric flask, and then adding 200 ml of ethyl alcohol (~95%). Swirl to mix. Add 10.5 ml of 2.0 N NaOH solution. Dilute the solution to the 1000-ml mark with deionized water.

Extract the filter aid sample with the citric acid/ethanol solution by combining a 1.00 gram of the filter aid sample with 100 ml of the citric acid/ethanol solution in a 500-ml conical flask. Cover the flask and swirl to mix. Place the flask on a platform shaker (INNOVA 2000 or equivalent) and shake for 2 hours at 250 rpm. At the end of 2 hours, filter the slurry through a membrane filter of 0.45 μm pore size (Fisherbrand vacuum filter holder, with fritted glass support, 350 ml capacity, prefilter size 35 mm, or equivalent). Transfer the filtrate to a clean flask.

Prepare a FerroZine® reagent solution by dissolving 2.57 g of FerroZine® reagent into 500 ml of an ammonium acetate/acetic acid buffer (prepared by combining 37.5 g of ammonium acetate with 75 ml glacial acetic acid and diluted to 500 ml with deionized water). Store the FerroZine® reagent solution in a brown glass bottle.

Fe Determination

1. Turn on the spectrophotometer (Milton Roy 21D or equivalent), adjust the wavelength to 560 nm, and set to absorbance mode. Let the instrument warm up for 20 minutes before any measurement.
2. Calibration standards: Pipette 25 ml of the blank citric acid/ethanol solution into each of six test tubes. Spike 10 μl, 20 μl, 50 μl, 100 μl, and 200 μl of a 100 μg/ml Fe standard solution (Fe reference standard solution, 1000 ppm, Fisher certified or equivalent) into five of the six test tubes, respectively (the sixth test tube being a blank reference), and mix well. These calibration standards correspond to 0.04 μg/ml, 0.08 μg/ml, 0.20 μg/ml, 0.40 μg/ml, and 0.80 μg/ml of Fe concentration, respectively.
3. Filter aid samples: Pipette 25 ml of the filter aid sample into a test tube labeled for the sample.
4. Add approximately 25 mg of powdered L-ascorbic acid ($C_6H_8O_6$, certified ACS grade) to each test tube (i.e., blank, calibration standards, and filter aid samples), mix well (Thermolyne mixer or equivalent) for 5-15 seconds.
5. Add 1.0 ml of the FerroZine® reagent into each test tube and mix well. Let the test tubes stand for 15 minutes for color development.
6. Transfer each solution into a clean round cuvet (1 in. diameter) and insert the cuvet into the cuvet adapter of the spectrophotometer. Align the cuvet so that the mark on the cuvet points to the mark on the sample holder.
7. Adjust the absorbance to 0.000 with the citric acid/ethanol blank prepared in the same fashion as the calibration standards but without the addition of Fe standard solution.
8. Starting from low to high, sequentially measure the Fe calibration standards, measuring the absorbance with the same cuvet and cuvet position. Rinse the cuvet after each measurement. Record each measurement.
9. Measure the absorbance of the filter aid sample.
10. Plot the Fe concentrations against the absorbance and determine the Fe concentration of the filter aid sample from the calibration curve. Alternatively, perform linear regression for the standard data and calculate the results according to the regression equation: Fe (mg/kg)=(filtrate Fe concentration (ppm)×100)/sample weight (g).

Example 4

The following describes the procedure for determining the amount of soluble aluminum in a filter aid sample (e.g., diatomite material or mixture of diatomite materials).

Prepare an aluminum standard solution (10 ppm and 100 ppm) by pipetting 2 ml of nitric acid into about 50 ml of deionized water in a 100-ml volumetric flask, then pipetting 10.0 ml of Al reference standard solution (1000 ppm, Fisher certified or equivalent) and diluting the 100-ml mark (1 ml=100 μg Al).

Prepare a matrix modifier by dissolving 0.35 g of magnesium nitrate hexhydrate ($Mg(NO_3)_2.6H_2$) in 100 ml of deionized water, adding 0.2 ml of Triton® X-100, and gently swirl to mix.

Prepare a citric acid/ethanol solution by dissolving 4.6 g of citric acid monohydrate in approximately 500 ml deionized water in a 1000-ml volumetric flask, and then adding 200 ml of ethyl alcohol (~95%). Swirl to mix. Add 10.5 ml of 2.0 N NaOH solution. Dilute the solution to the 1000-ml mark with deionized water.

Extract the filter aid sample with the citric acid/ethanol solution by combining a 1.00 gram of the filter aid sample with 100 ml of the citric acid/ethanol solution in a 500-ml conical flask. Cover the flask and swirl to mix. Place the flask on a platform shaker (INNOVA 2000 or equivalent) and shake for 2 hours at 250 rpm. At the end of 2 hours, filter the slurry through a membrane filter of 0.45 μm pore size (Fisherbrand vacuum filter holder, with fritted glass support, 350 ml capacity, prefilter size 35 mm, or equivalent). Rinse the conical flask with deionized water, transfer the filtrate into the flask and cover.

Carefully rinse the filtration holder and the flask with deionized water after each sample. Filter about 200 ml of blank citric acid/ethanol solution in the same manner for use as a blank and for dilution of a sample when necessary.

Al Determination

1. Calibration standards: Label 10 calibrated graduated test tubes as 0 ppm, 10 ppm, 25 ppm, 50 ppm, 100 ppm, 200 ppm, 300 ppm, 400 ppm, 600 ppm, and 800 ppm, respectively. Pipette 10 μl, 25 μl, 50 μl, 100 μl, 200 μl, 300 μl, 400 μl, 600 μl, and 800 μl of 10 ppm Al standard solution into nine of the test tubes. Add blank citric acid/ethanol solution to each test tube to the 10 ml mark to serve as Al calibration standards. Add 10 ml of blank citric acid/ethanol solution to the tenth test tube as a blank.
2. Label ten clean disposable polystyrene test tube for the 9 citric acid/ethanol calibration standards spiked with Al and the blank, and label one test tube for each filter aid sample.
3. Pipette 1.00 ml of the blank and each calibration standard and filter aid sample into respective labeled test tubes. Add 1.00 ml of the matrix modifier into each test tube and cover. Gently inverse each test tube so that the contents are thoroughly mixed.
4. Install the aluminum hollow cathode lamp on the graphite furnace atomic absorption spectrometer (see instrument parameters in Table 9 below). Turn on the power of the spectrometer and the D2 background corrector.
5. Adjust the wavelength around 309.4 nm so that minimum absorbance is achieved. Adjust the X and Y controls of the hollow cathode lamp and move it axially to optimize the lamp position. Once the lamp current and the PMT power have been optimized to give out the lowest absorbance reading (adjust to ~0.000 ABS reading), turn on the BGC switch and adjust the balance control knob so that the ABS reading returns to zero. (Note: the beam splitter has to be in place when the D2 background corrector is used.)
6. Let the Instrument warm for at least 15 minutes. It may be necessary to readjust the wavelength, the PMT power, and the BGC balance control so that the absorbance reading returns to zero.
7. Turn on the Argon gas supply and the cooling water.
8. Turn on the integrator. Set proper integration parameters. It is recommended that peak areas should be used in the spectrum analysis.
9. Before any measurements, several injection and burn up cycles should be made to clean up the furnace. The cleaning solution used in this operation can be made with deionized water and matrix modifier (1:1). Inject 20 μl of the cleaning solution on the L'vov platform in the furnace tube. Start the atomization cycle by press "START" button. Several such cleaning operations may be needed to make the furnace reach the lowest background absorption.
10. Inject 20 μl of the citric acid/ethanol blank and initiate the atomization cycle programmed according to Table 9.
11. Repeat step 10 by injecting each of the Al calibration standards, sequentially from low concentration to high concentration, then inject each unknown sample. Three injections should be made with each standard and sample. Record each spectrum.
12. If a sample shows a peak area higher than that of the highest working standard, the sample should be diluted with blank citric acid ethanol before measurement. For best accuracy, the peak area of a diluted sample should be lower than the highest standard.
13. Using the peak area data, plot the Al concentrations against the absorbance and find the Al concentration of the unknown sample from the calibration curve. Alternatively, perform linear regression for the standard data and calculate the results according to the regression equation: Al (ppm)=(C×D.F.×0.1)/Sample Weight (g), where C=Al concentration read from the calibration curve (ppb), and D.F.=dilution factor.

TABLE 9

| Wavelength | Slit Width | HCL$^a$ Current | PMT Voltage | Background Correction | Sample Volume |
|---|---|---|---|---|---|
| 309.4 nm | 0.7 Å | 4.8 mA | −425 | D$_2$ on | 10 μl |

| Modifier$^b$ Volume | Shealth Gas Flow$^c$ | Internal Gas Flow | Little Gas Flow | Quantitation | Calibration Standards (ppb) |
|---|---|---|---|---|---|
| 10 μl | 1300 ml/min | 400 ml/min | off | peak area | 0, 25, 50, 100, 150, 200, 300, 400, 600, 800 |

| TEMPERATURE RAMP CONDITIONS | | | |
|---|---|---|---|
| Step | Ramp Rate (° C.) | Temperature (° C.) | Dwell Time (sec) |
| Drying | 1.0 | 110 | 10 |
| Ashing | 20.0 | 1200 | 12 |
| Atomization | one step | 2600 | 5 |
| Cleaning | one step | 2800 | 2 |
| Cooling | | 25 | 20 |

$^a$HCL = Hollow Cathode lamp.
$^b$The modifier contains 2000 ppm Mg(NO$_3$)$_2$ and 2.0 g/l of Triton® X-100 (Aldrich).
$^c$The sheath gas (ultrapure grade Ar) is kept on while the internal gas (Ar) is turned off during atomization.

Example 5

Several samples of coarse diatomite (DE2) from Example 2 were treated with oxalic acid. In each case, 75.5 kg of the diatomite was added to 757 L of a 0.5 N solution of oxalic acid preheated to 85° C. to make a slurry. The slurry was agitated moderately for 2 hours at 85° C. and then filtered via vacuum filtration. Following the acid-treatment, each filtered solid was re-suspended in ammonium hydroxide (0.1%, 0.02%, or 0.01%) or sodium percarbonate (1%, 0.5%, 0.2%, or 0.1%) as summarized in Table 9 in order to adjust pH. The acid-treated diatomite samples were then filtered again and rinsed 5-6 times with deionized water.

Soluble iron content was measured by extraction with a citric acid/ethanol solution as described above in Example 3. The resulting pH and soluble iron content are shown in Table 10. The chemical compositions of the acid-treated DE2 samples C, D, and G are shown in Table 11 with bulk iron (Fe$_2$O$_3$) concentrations of about 1.3%, aluminum (Al$_2$O$_3$) concentrations of about 5%, and silica (SiO$_2$) concentrations of about 91%.

TABLE 10

| Acid-treated DE2 sample | Ammonium hydroxide | Sodium percarbonate | pH | Soluble iron (mg/kg) |
|---|---|---|---|---|
| A | 0.1% | — | 6.1 | 41.1 |
| B | 0.02% | — | 6.2 | 28.5 |
| C | 0.01% | — | 4.9 | 6.5 |
| D | — | 1% | 7.1 | 120.5 |
| E | — | 0.5% | 6.2 | 42.3 |
| F | — | 0.2% | 6.3 | 16 |
| G | — | 0.1% | 5.1 | 7.2 |

TABLE 11

|  | Sample C | Sample D | Sample G |
|---|---|---|---|
| $Na_2O$ (%) | 0.47 | 0.54 | 0.47 |
| MgO (%) | 0.68 | 0.69 | 0.68 |
| $Al_2O_3$ (%) | 4.98 | 5.03 | 4.96 |
| CaO (%) | 0.22 | 0.22 | 0.22 |
| $SiO_2$ (%) | 91.16 | 90.99 | 91.16 |
| $P_2O_5$ (%) | 0.11 | 0.10 | 0.10 |
| $K_2O$ (%) | 0.84 | 0.83 | 0.83 |
| $TiO_2$ (%) | 0.27 | 0.27 | 0.27 |
| $Fe_2O_3$ (%) | 1.27 | 1.30 | 1.28 |
| $SO_3$ (%) | 0.02 | 0.02 | 0.2 |
| Sulfur (%) | 0.01 | 0.01 | 0.01 |

The results in Table 10 indicate that both ammonium hydroxide and sodium percarbonate adjusted the pH within a range of about 5-8. However, the rinse with 0.1% sodium percarbonate (Sample G) produced pH and citric acid/ethanol soluble iron values within desired limits. The higher concentrations of sodium percarbonate (0.2%, 0.5% and 1%) may increase the possibility of formation of sodium ferrioxalate fixing iron in the octahedral complex, which may survive water rinsing to appear in soluble form in the following citric acid/ethanol extraction.

Example 6

Several samples of coarse diatomite (DE2) and one sample of fine diatomite (DE1) were treated with 0.5 N oxalic acid and rinsed with 0.1% sodium percarbonate as described above in Example 5. The soluble iron content was measured as described in Example 3 above. The soluble aluminum content was measured as described in Example 4 above. Results are shown in Table 11.

TABLE 11

|  | Citric acid/ethanol soluble Fe (mg/kg) | Citric acid/ethanol soluble Al (mg/kg) |
|---|---|---|
| DE 1 (lot 1) | 9.3 | 16.6 |
| DE 2 (lot 2) | 10.7 | 19.2 |
| DE 2 (lot 3) | 7.4 | 17.8 |
| DE 2 (lot 4) | 11.0 | 9.3 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A filter aid composition comprising:
    a first acid-treated silica-based filter aid having a first particle size distribution; and
    a second acid-treated silica-based filter aid having a second particle size distribution,
    wherein the filter aid composition has a multimodal particle size distribution such that the first particle size distribution has a $d_{50}$ of 15-30 μm and the second particle size distribution has a $d_{50}$ of 2-10 μm;
    wherein the first silica-based filter aid and the second silica-based filter aid are blended to form the filter aid composition.

2. The filter aid composition of claim 1, wherein the filter aid composition comprises from about 5 wt % to about 95 wt % of the first acid-treated silica-based filter aid.

3. The filter aid composition of claim 1, wherein the filter aid composition has a permeability in a range from about 0.05 Darcies to about 0.2 Darcies.

4. The filter aid composition of claim 1, wherein the first acid-treated silica-based filter aid has a soluble iron content less than or equal to about 20 ppm.

5. The filter aid composition of claim 1, wherein the first acid-treated silica-based filter aid has a soluble aluminum content less than or equal to about 20 ppm.

6. The filter aid composition of claim 1, wherein the second acid-treated silica-based filter aid has a soluble iron content less than or equal to about 20 ppm.

7. The filter aid composition of claim 1, wherein the second acid-treated silica-based filter aid has a soluble aluminum content less than or equal to about 20 ppm.

8. The filter aid composition of claim 1, wherein the filter aid composition has a filtration flux rate in a range from about 0.1 L/m²-min to about 45 L/m²-min.

9. The filter aid composition of claim 1, wherein the filter aid composition has a centrifuged wet density rate in a range from about 0.1 g/cm³ to about 0.3 g/cm³.

10. The filter aid composition of claim 1, wherein the filter aid composition has a pressure differential less than about 4.0 bar after 1 hour of filtration at 1.0 g/L.

11. The filter aid composition of claim 1, wherein the filter aid composition has a conductivity of less than about 20 μS/cm.

12. The filter aid composition of claim 4, wherein the first acid-treated silica-based filter aid has a soluble iron content less than or equal to about 15 ppm.

13. The filter aid composition of claim 5, wherein the first acid-treated silica-based filter aid has a soluble aluminum content less than or equal to about 15 ppm.

14. The filter aid composition of claim 6, wherein the second acid-treated silica-based filter aid has a soluble iron content less than or equal to about 15 ppm.

15. The filter aid composition of claim 7, wherein the second acid-treated silica-based filter aid has a soluble aluminum content less than or equal to about 15 ppm.

16. The filter aid composition of claim 4, wherein the first acid-treated silica-based filter aid has a soluble iron content less than or equal to about 10 ppm.

17. The filter aid composition of claim 5, wherein the first acid-treated silica-based filter aid has a soluble aluminum content less than or equal to about 10 ppm.

18. The filter aid composition of claim 6, wherein the second acid-treated silica-based filter aid has a soluble iron content less than or equal to about 10 ppm.

19. The filter aid composition of claim 7, wherein the second acid-treated silica-based filter aid has a soluble aluminum content less than or equal to about 10 ppm.

* * * * *